United States Patent [19]
Luecke

[11] 4,092,527
[45] May 30, 1978

[54] CALCULATOR WITH INTERCHANGEABLE KEYSET

[75] Inventor: Gerald Luecke, Rockwall, Tex.

[73] Assignee: Texas Instruments Incorporated, Dallas, Tex.

[21] Appl. No.: 764,109

[22] Filed: Jan. 31, 1977

[51] Int. Cl.² .......................... G06F 7/38; G06F 15/02
[52] U.S. Cl. .......................................... 364/709; 35/5; 35/31 C; 340/365 R; 364/708
[58] Field of Search ................ 235/152, 156, 145 R, 235/146; 35/5, 6, 30, 31 R, 31 C; 340/365 R

[56] References Cited

U.S. PATENT DOCUMENTS

| | | | |
|---|---|---|---|
| 3,253,352 | 5/1966 | Kobler et al. | 35/5 |
| 3,560,964 | 2/1971 | Bedell et al. | 340/365 R |
| 3,971,925 | 7/1976 | Wenninger et al. | 235/156 |
| 3,978,328 | 8/1976 | Fabry et al. | 235/156 |

OTHER PUBLICATIONS

D. P. Karp et al., "Functionally Alterable ... Replaceable Keys" IBM Tech. Disc. Bulletin, vol. 17, No. 1, Jun. 1974, pp. 309-311.

*Primary Examiner*—Jerry Smith
*Attorney, Agent, or Firm*—Rene' E. Grossman; James T. Comfort; Richard P. Berg

[57] ABSTRACT

A calculator, which may be used for educational purposes, for instance, is preferably provided with an integrated circuit, a display for displaying a number outputted by the integrated circuit, an array of key switches for inputting numeric and functional data to the integrated circuit, a keyset comprising an array of key switch push buttons moveably disposed in openings in a member retaining the array and a case in which the integrated circuit, display and the array of key switches are disposed. The case also is provided with an opening for removeably receiving the keyset, the keyset being disposed adjacent to the array of key switches when received in the opening. The calculator is preferably provided with a plurality of such keysets, the keysets each having different configurations of key push buttons for permitting an operator of the calculator to be able to access either to selected key switches or all key switches depending upon the particular keyset used. Further, the keyset preferably temporarily locks into place when operationally disposed against the array of key switches and the operation of a given push button causes actuation of the adjacent key switch.

12 Claims, 9 Drawing Figures

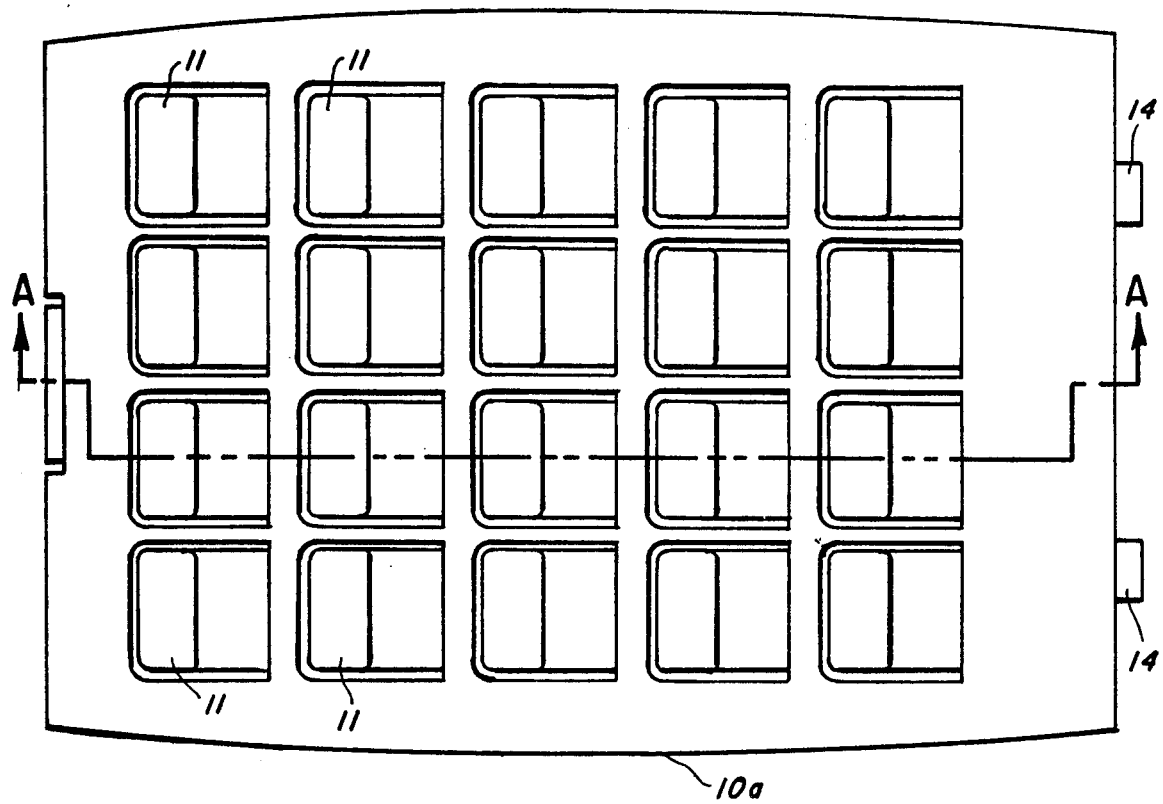
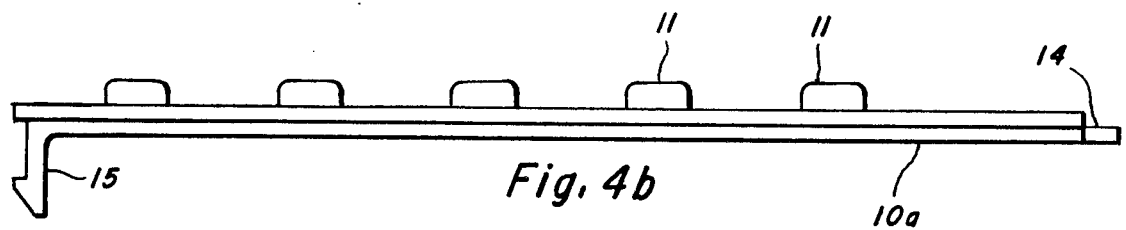
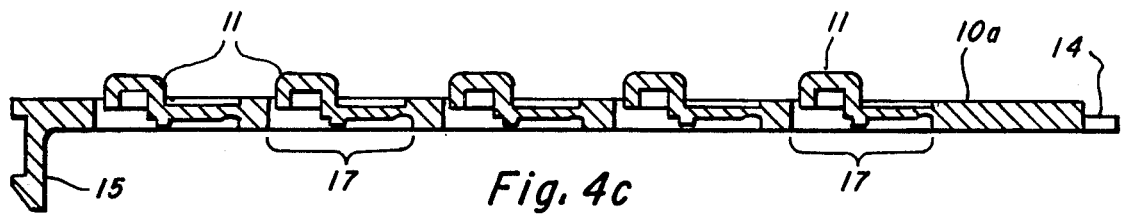

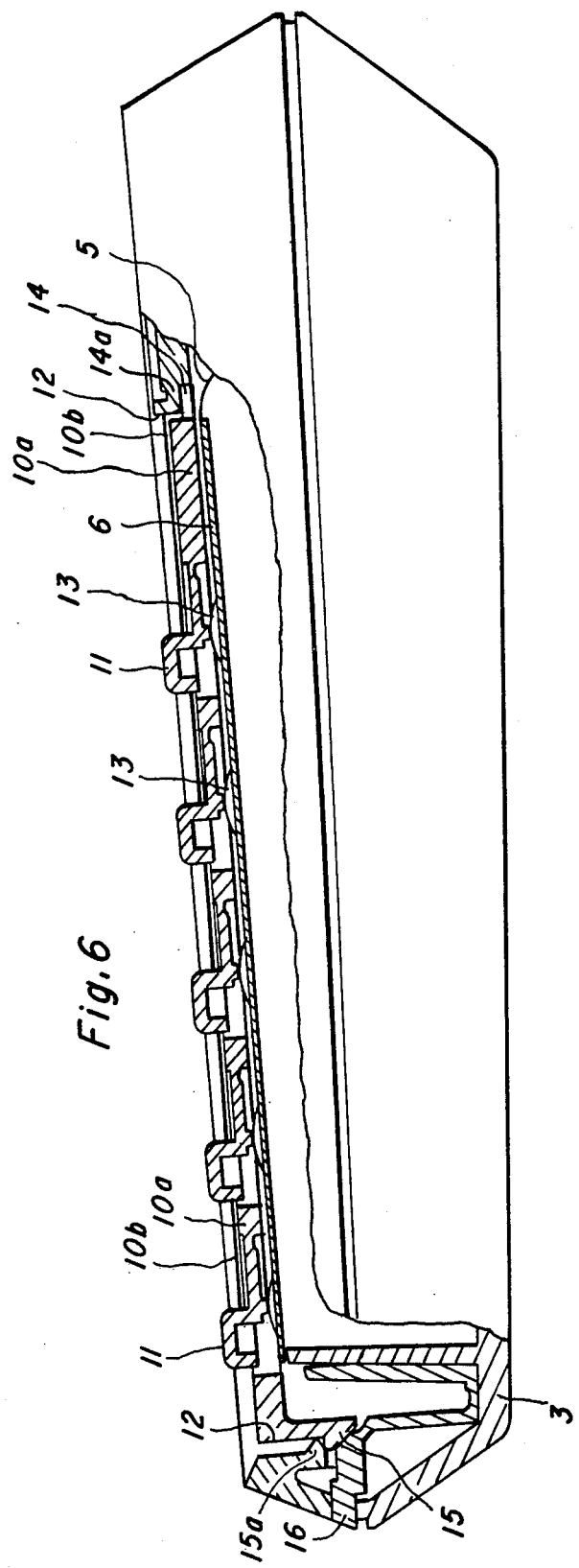

CALCULATOR WITH INTERCHANGEABLE KEYSET

BACKGROUND OF THE INVENTION

Economically priced electronic calculators are becoming a means to be used by educators for teaching mathematics at all grade levels. It has been suggested that the electronic calculator, particularly when used with specially prepared teaching materials, such as the Elementary Mathematics Concepts with Calculators Program published by Texas Instruments Incorporated, is a valuable tool for teaching elementary arithmetic and logical reasoning to children in the first through sixth grades. However, when introducing the basic concept of our number system to a young child, it has been suggested that a special electronic calculator be provided to the child. Such a calculator preferably performs the most simple functions. For example, such a calculator may have merely zero and one numeral keys and plus, equal and clear function keys. Then as the pupil exhibits an understanding of the meaning of the aforementioned numerals and functions and acquires skills in understanding basic mathematical concepts, it has been suggested that the child be provided with increasingly more sophisticated calculators. The calculator used at the end of this learning cycle might be equipped to perform the four basic arithmetic functions using all ten digits of our decimal number system, for instance.

It has been suggested that the ability to provide school children with such a varied range of electronic calculators, would be a valuable teaching tool to augment the more traditional teaching tools presently used to teach elementary grade children simple arithmetic concepts and principles. It has been further suggested, that in lieu of manufacturing individual calculators having the aforementioned range of capabilities, that a full four function electronic calculator be provided with a plastic mask. The mask would overlay the calculator and be provided with openings which would align with selected key push buttons on the calculator. These openings would permit the child to access only selected keys when the mask was in place. It has been found, however, that providing such a full function calculator with a plastic mask permitting access only to selected keys has certain disadvantages. The disadvantages include the propensity of the mask to be easily removed from the calculator and inadvertent operation of covered key push buttons by the child. This latter problem arises due to the fact that the mask typically must be made from very thin plastic to permit access to desired keys; but the thinness of the plastic often fails to prevent inadvertent operation of the covered keys when the pupil merely lies his hand across a portion of the calculator keyboard covered by the mask.

It is therefore one object of this invention to provide an electronic calculator capable of being configured to permit entry of only selected numerals and selected functions. It is a further object of this invention to permit the configuration of the selected numerals and selected functions enterable to be altered at a school or other point of use without requiring major disassembly of the calculator. It was another object to prevent inadvertent operation of keys not included in the configuration selected.

It is still yet another object of this invention to provide a calculator with an interchangeable keyboard, the calculator typically being provided with a plurality of such interchangeable keyboards and the plurality of interchangeable keyboards being provided with different preselected configurations of numeric and/or function keys.

The foregoing objects are achieved according to the present invention as is now described. In a preferred embodiment of the invention, an electronic calculator preferably having an integrated circuit, a display for displaying a number outputted by the integrated circuit, an array of key switches for inputting numeric and functional data into the integrated circuit and a case in which the integrated circuit, display and array of key switches are disposed is preferably provided with a removable keyset. The removable keyset preferably includes an array of key switches push buttons moveably disposed in openings in a member retaining the array of key switch push buttons and the case is preferably provided with an opening for receiving the removeable keyset. When removeably received in the opening, the array of key switch push buttons is operationally disposed adjacent to the array of key switches, thereby permitting the input of numeric and functional data when particular key switch push buttons are depressed causing actuation of the adjacently disposed key switches. The case is also preferably provided with a release plunger and locking mechanism permitting the key set to be temporarily locked into place in the opening in the case. Preferably, the electronic calculator is provided with a plurality of such keysets, the keysets being provided with different configurations of key switch push buttons. The plurality of removeable keysets may be interchanged to present an operation with a selected configuration of key push buttons, whereby the operator can input only selected numeric functional data according to the key switch push buttons provided in the keyset then positioned in the opening in the calculator's case.

BRIEF DESCRIPTION OF THE DRAWINGS

The novel features believed characteristic of the invention are set forth in the appended claims. The invention itself, however, as well as the preferred mode of use, further objects and advantages thereof, will best be understood by reference to the following detailed description of an illustrative embodiment when read in conjunction with the accompanying drawings, wherein:

FIG. 4a, 4b and 4c are top, side and side sectional views of the keyset;

FIG. 6 is a partially cut away side view of the keyset installed in a calculator case adjacent to the calculator's array of key switches.

DETAILED DESCRIPTION

Figure 1:
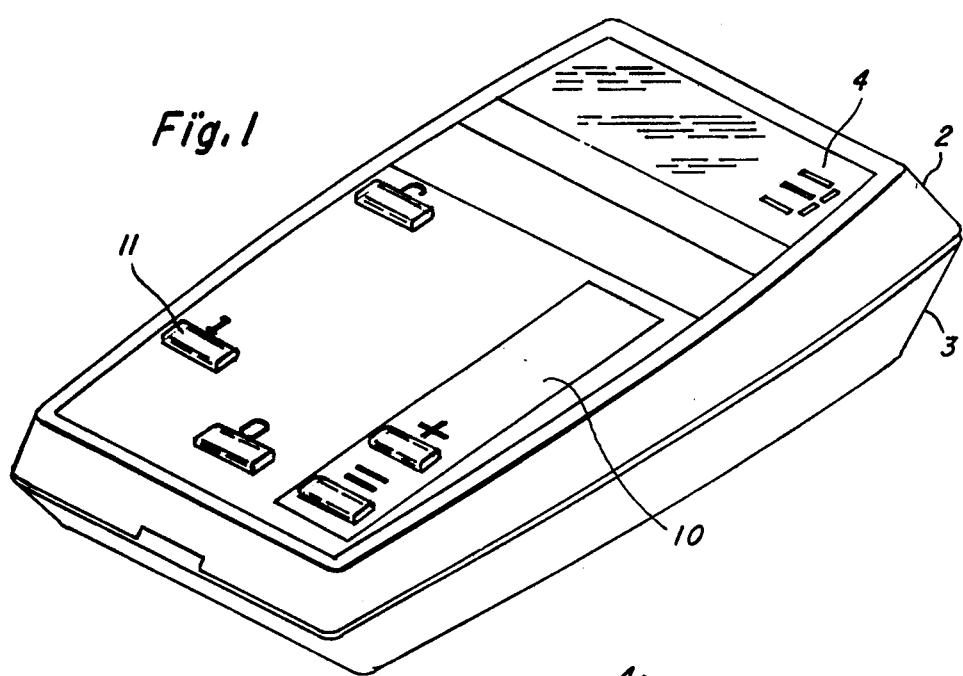
FIG. 1 is a pictorial view of an educational calculator of the type embodying the present invention.

FIG. 1 is a pictorial view of an educational calculator of the type embodying the present invention. The calculator includes a case, which may be implemented as a case top piece 2 and case bottom piece 3. The top and bottom pieces 2 and 3 of the case are preferably assembled at the factory and may be secured together using screws, fasteners, or other fastening means. The calculator is provided with a display 4 which may be an array of light emitting diodes, a vacuum flourescent tube, a gas discharge tube or other display means. The case is further provided with a removable keyset 10, the keyset 10 shown in FIG. 1 being provided with five key switch push buttons 11. As can be seen from FIG. 1, the five push buttons permit inputting the numerals one and zero and the functions plus, equal and clear. The calculator is typically provided with a plurality of different keysets 10, the keysets differing in the configuration of push buttons 11 implemented therewith. Of course, the number of push buttons 11 implemented in any given keyset 10 is a design choice.

Figure 2:
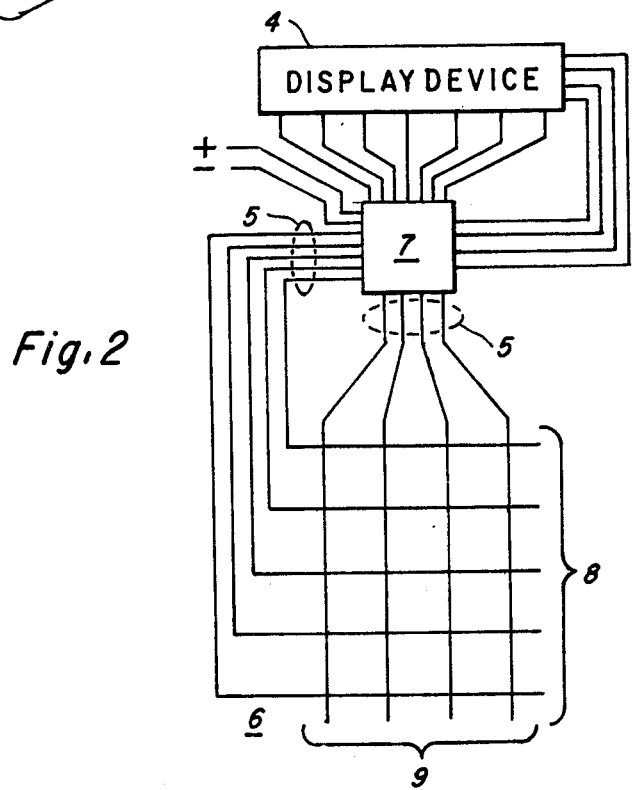
FIG. 2 is simplified schematic diagram of a calculator.

Referring now to FIG. 2, there is shown a simplified schematic diagram of the calculator. The calculator preferably includes an array of key switches 6, the key switch contacts occurring at the intersection of matrix conductors 8 and 9 shown in FIG. 2. It should be evident to those skilled in the art, moreover, that the array of switches 6 may be formed without matrix conductors 8 and 9, but rather using a non-matrixed pattern of conductors as has been used in the prior art. However, matrix conductors 8 and 9 are shown in FIG. 2 because of their common useage in modern calculators.

The array of switches 6 is used to input numeric and functional data into the calculator by closing the various switches, here formed at the intersections of conductors 8 and 9. The closure of these switches is detected by integrated circuit 7 and cause integrated circuit 7 to output numeric data according to the particular switches closed. The outputted numeric data is provided to display device 4 for rendering a visual display of the numeric data. Integrated circuit 7, array of key switches 6 and display device 4 are preferably disposed in the case formed by pieces 2 and 3 (FIG. 1). While many types and styles of key switch arrays 6 may be used with the present invention, it has been found that the array of key switches disclosed in U.S. Pat. No. 3,952,174 which issued to Henry Boulanger on Apr. 20, 1976 and which is assigned to the assignee of this invention, is well suited for use in the present invention. U.S. Pat. No. 3,952,174 is hereby incorporated herein by reference.

Figure 3:
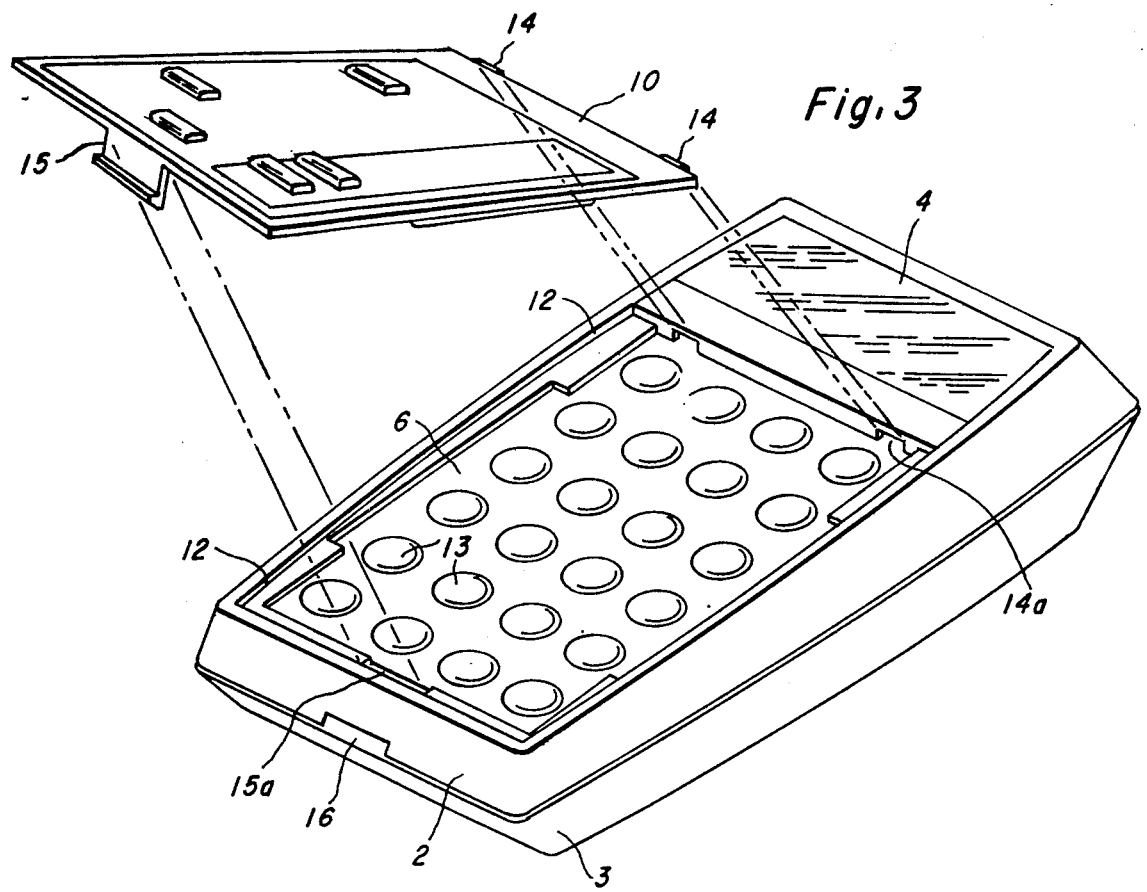
FIG. 3 is a pictorial view of a calculator with keyset removed.

Referring now to FIG. 3, there is shown a calculator with key set 10 removed. As can be seen from FIG. 3, the case top pieces 2 is provided with an opening 12 or other such means for removeably receiving keyset 10. As can also be seen from FIG. 3, when keyset 10 is removeably received in opening 12, the key push buttons 11 provided with keyset 10 are operationally disposed adjacent to individual key switches 13 in array 6. Keyset 10 and the calculator case are provided with means for temporarily locked removeably keyset 10 in place, the locking means including securing clasps 14 and 14a as well as 15 and 15a. A release plunger 16 is provided for disengaging clasp 15 and 15a.

Referring now to FIG. 4a, there is shown a top view of keyset 10. Keyset 10 may be made in two portions, a member 10a and a bezel 10b, member 10a being preferably molded from plastic and bezel 10b preferably being a metal bezel whose function will be described subsequently. Keyset 10 is shown with push buttons 11 disposed in 20 locations, those locations corresponding to the 24 switches 13 shown in FIG. 3. While member 10a could, of course, be molded with differing numbers of push buttons 11 depending on the configuration of keyset 10 to be manufactured, it has been found that keyset 10 may be easily manufactured if all members 10a are identical and the undesired push buttons 11 for given configurations of keyset 10 being removed before mating member 10a with bezel 10b. The resulting spaces caused by such removal are concealed by bezel 10b which may have configurations of the type shown in FIG. 5, for instance. Then member 10a with selected push buttons 11 removed according to the particular bezel 10b used is adhesively attached bezel 10b.

In FIG. 4b there is shown a side view of keyset 10 and in FIG. 4c there is shown a section view taken along section line A—A depicted in FIG. 4a. As can be seen from FIG. 4c, push buttons 11 are removeably received within openings 17 in member 10a and further are connected to member 10a. The flexibility of the plastic from which member 10a is manufactured permits push buttons 11 to move within openings 17 when depressed by pupil or other operator. Of course, push buttons 11 can be arranged to merely be moveably received in openings 17 without any connection to member 10a, but the design of member 10a and push buttons 11 disclosed simplifies the manufacture of keyset 10.

Figure 5:
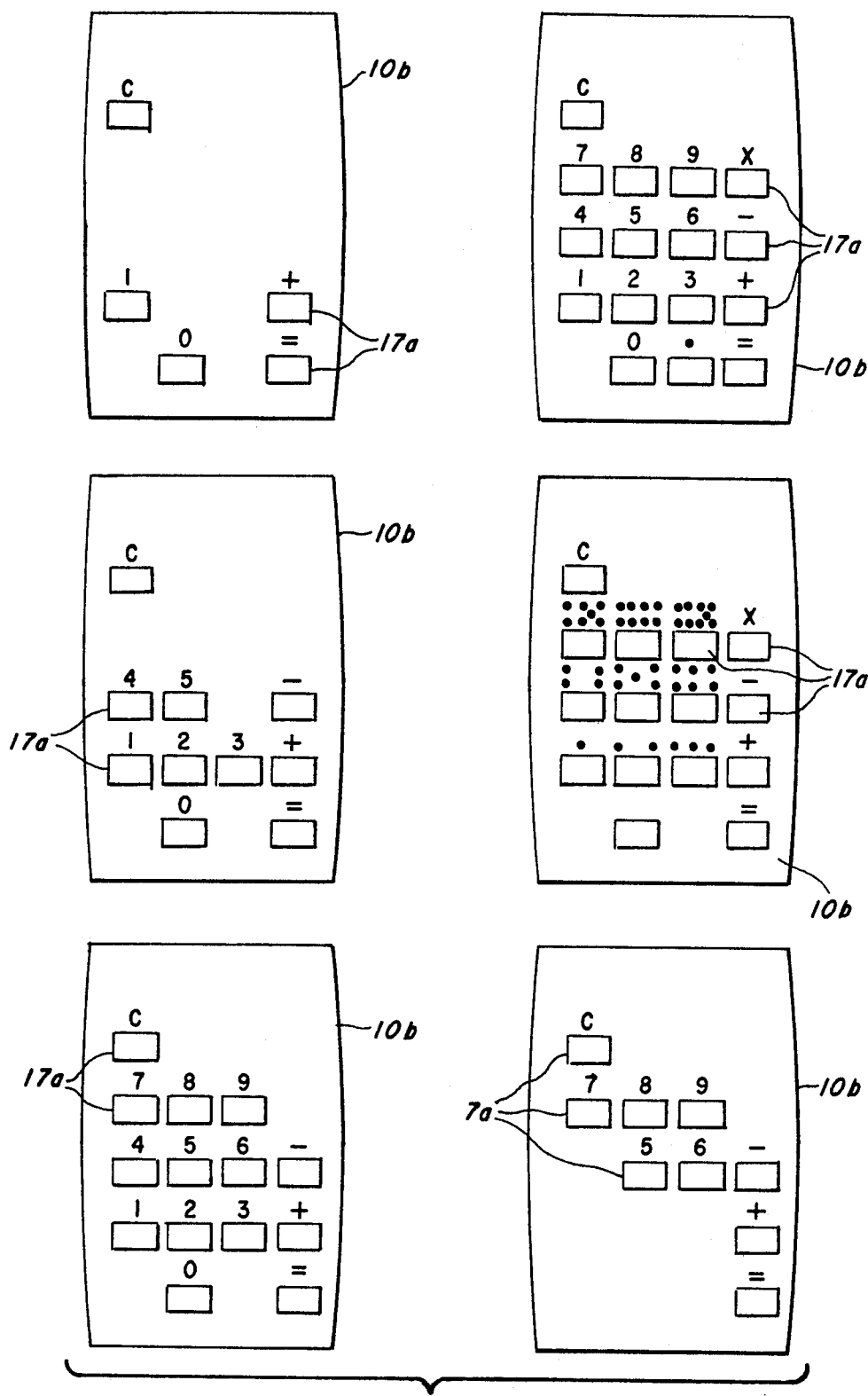
FIG. 5 depicts various configurations of the keyset's bezel.

In FIG. 5, there is shown various bezels 10b which may be used to overlay members 10a, in forming keyboard 10, the bezel having openings 17a provided in way of operable key push buttons 11. Push buttons 11 which are not used in a particular keyset configuration may be simply removed from member 10a by cutting or punching, for instance. Bezels 10b may be decoratively painted and appropriate numerals and other characters may be added as shown in FIGS. 1, 3 and 5.

Referring now to FIG. 6, there is shown a partially cut away side view of the calculator showing keyset 10 received in opening 12. Keyset 10 is shown with member 10a affixed to bezel 10b and with push buttons 11 protruding through openings 17a in bezel 10b. Push buttons 11 are operationally disposed adjacent to key switches 13 disposed in array 6. Array 6 has wires 5 interconnecting array 6 with intergrated circuit 7 (FIG. 2). Keyset 10 is temporarily retained in place by a clasp 15 and 15a at the other end of the keyboard 10. Further, a release plunger 16 is provided for disengaging clasp 15, 15a.

While an embodiment of keyset 10 comprising member 10a with push buttons 11 and bezel 10b has been disclosed, it should be evident that the different configurations of keyset 10 may also be manufactured by molding member 10a with the number of push buttons 11 needed for the particular configuration manufactured. Then the opening which would otherwise occur in the way of a removed push button may be simply filled during the molding process. In that case, bezel 10b may be eliminated. Keyset 10 is preferably manufactured with both member 10a and bezel 10b because of the aforementioned simplifications and because the resulting product has a nicely finished appearance.

Figure 7:
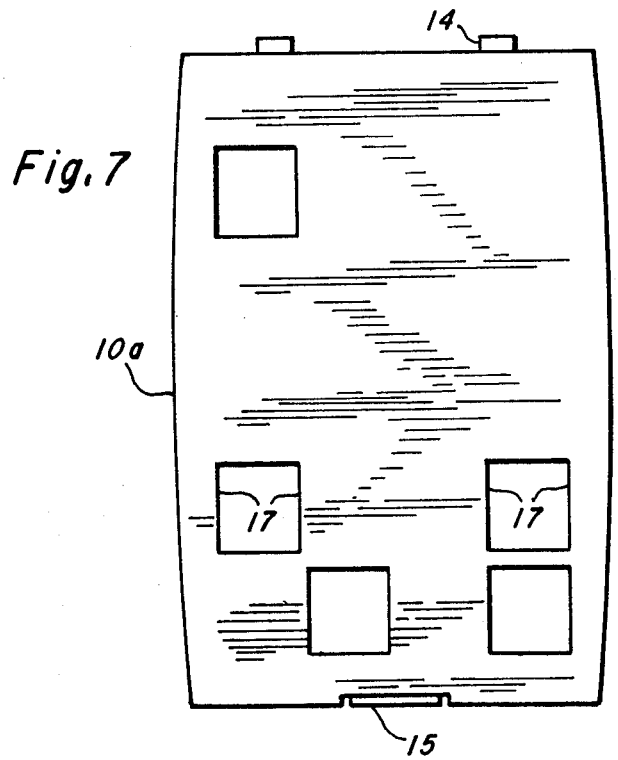
FIG. 7 shows a keyset with openings provided to aligned with selected key switch contacts.

Still further, the use of push buttons 11 may be eliminated if member 10a were molded with openings 17 provided in selected locations therein as shown in FIG. 7. Openings 17 are located to align with selected key switch contacts 13 when member 10a is installed in case opening 12 (FIG. 3). The openings 17 in member 10a then permit the operator's finger to directly depress switch 13 in lieu of using the intermediary device of push button 11. The aforementioned embodiments utilizing push buttons 11 are preferred over this embodiment not using any push buttons because the desirable tactile feel generated by the switch 13 disclosed in U.S. Pat. No. 3,952,174, for instance, is reduced when directly operated by an operator's finger compared to operation via a key push button 11.

Having described the invention with respect to particular embodiments thereof, further modification may now suggest itself to those skilled in the art. The invention itself however is not to be limited to the embodiments disclosed, except as set forth in the appended claims.

What is claimed is:

1. An apparatus comprising:
   (a) an integrated circuit,
   (b) a display for displaying a number outputted by said integrated circuit,
   (c) an array of key switches for inputting numeric and functional data to said integrated circuit,
   (d) an array of key switch push buttons moveably disposed in openings in a member retaining said array of key switch push buttons, and
   (e) a case in which said integrated circuit, display and array of key switches are installed during manufacture and having means for removably receiving said member retaining said array of key switch push buttons, said array of key switch push buttons being operationally disposed adjacent to said array of key switches when removably received in said case, said receiving means being adapted for operation by an operator of said apparatus for temporarily receiving said array of key switch push buttons atter manufacture of said apparatus.

2. The apparatus according to claim 1, wherein said member retaining said array of key switch push buttons comprises an essentially planar sheet of material selected from the groups consisting of metals and plastics, having a plurality of openings therein, at least one of said openings receiving at least one of said key switch push button from said arrays of keys switch push buttons.

3. The apparatus according to claim 2 wherein said at least one key switch push button is moveably attached to said planar sheet.

4. The apparatus according to claim 3, wherein said apparatus is provided with more than one said member retaining said array of said key switch push buttons, said case removeably receiving one of said more than one said member at any given time and at least some of said more than one said member being provided with fewer keys switch push buttons in the array of keys switch push buttons than the number of key switches in said array of keys switches disposed in said case.

5. Apparatus according to claim 2, wherin said case includes means for temporarily locking said member retaining said array of key switch push buttons in said receiving means and wherein said case further includes means for unlocking said locking means in response to operation of a release button.

6. The apparatus according to claim 1, wherein said apparatus is provided with more than one said member retaining said array of key switch push buttons, said case removeably receiving one of said more than one said member at any given time and at least some of said more than one said member being provided with fewer keys switch push buttons in the array of keys switch push buttons than the number of key switches in said array of keys switches disposed in said case.

7. The apparatus according to claim 6, wherein at least some of said more than one said member are provided with differing configurations of said array of key switch push buttons.

8. The apparatus according to claim 7, wherein said member includes a metal bezel to which a plastic member is attached, the array of key switch push buttons being resiliently attached to said plastic member and being disposed in openings through said metal bezel and plastic member.

9. A calculator comprising:
   (a) an integrated circuit,
   (b) a display device for displaying a number outputted by said integrated circuit,
   (c) an array of key switches for inputting numeric and functional data to said integrated circuit,
   (d) a member having a plurality of openings therein, said openings aligning with selected ones of said key switches when said member is disposed adjacent to said array, and
   (e) a case in which said integrated circuit, display device and array are disposed during manufacturing of said calculator, said case including means for removably receiving said member and disposing said member adjacent to said array, which means is adapted for use by an operator of said calculator for temporarily receiving said member after manufacture of said calculator.

10. The calculator according to claim 9, wherein said calculator is provided with more than one said member, said case removeably receiving one of said more than one said member at any given time and at least some of said more than one said member being provided with fewer openings than the number of key switches in said array.

11. The calculator according to claim 10, wherein at least some of said more than one said member are provided with differing configurations of said openings in said member.

12. The calculator according to claim 9, wherein said member includes an array of key switch push buttons, said key switch push buttons being disposed in selected openings therein.

* * * * *